(12) United States Patent
Grüninger

(10) Patent No.: US 10,785,954 B2
(45) Date of Patent: Sep. 29, 2020

(54) METHOD FOR HANDLING OF CHEESE BLOCKS

(71) Applicant: KALT MASCHINENBAU AG, Lütisburg (CH)

(72) Inventor: Siegfried Grüninger, St. Gallen (CH)

(73) Assignee: Kalt Maschinenbau AG, Lütisburg (CH)

( * ) Notice: Subject to any disclaimer, the term of this patent is extended or adjusted under 35 U.S.C. 154(b) by 346 days.

(21) Appl. No.: 15/344,909

(22) Filed: Nov. 7, 2016

(65) Prior Publication Data

US 2017/0135310 A1    May 18, 2017

(30) Foreign Application Priority Data

Nov. 13, 2015    (CH) ........................ 1653/15

(51) Int. Cl.
*A01J 25/12*    (2006.01)
*A01J 25/13*    (2006.01)
(Continued)

(52) U.S. Cl.
CPC .......... *A01J 25/123* (2013.01); *A01J 25/13* (2013.01); *A01J 25/15* (2013.01); *A23C 19/00* (2013.01); *A23C 2250/10* (2013.01)

(58) Field of Classification Search
CPC .......... A01J 25/123; A01J 25/13; A01J 25/15; A23C 19/00; A23C 2250/10
See application file for complete search history.

(56) References Cited

U.S. PATENT DOCUMENTS

| 913,889 A | 3/1909 | Hershiser |
| 2,815,708 A | 12/1957 | Pauly |

(Continued)

FOREIGN PATENT DOCUMENTS

| BR | 9300409 A | 9/1993 |
| CH | 353573 A5 | 5/1961 |

(Continued)

OTHER PUBLICATIONS

European Search Report dated Mar. 27, 2017 for European No. EP16 19 5210.

(Continued)

*Primary Examiner* — Erik Kashinikow
*Assistant Examiner* — Preston Smith
(74) *Attorney, Agent, or Firm* — Fleit Intellectual Property Law; Paul D. Bianco; Gary S. Winer

(57) ABSTRACT

A method and device for handling cheese blocks. Compressed cheese curd is released from the inner wall of a mould and after a turning operation is evacuated from the mould, with the mould rotated, lowered and shaken or blown. A lifting gripper is guided as far as the stop on a pick-up device, and in the mould the cheese block is subjected to a shaking movement. The mould, that is to say, the cassette, is then raised, rotated and guided back into the cassette press, so that the cheese block can be fixed in position on the lifting gripper by a clamping means. The pick-up plunger with the cheese block is then lowered, that is to say, retracted, the lifting gripper is traversed towards a secondary mould for the cheese block, preferably downwards, the clamping means open, and the cheese block is positioned in a secondary mould.

19 Claims, 4 Drawing Sheets

(51) Int. Cl.
  *A01J 25/15* (2006.01)
  *A23C 19/00* (2006.01)

(56) References Cited

U.S. PATENT DOCUMENTS

| | | | |
|---|---|---|---|
| 2,846,767 | A | 8/1958 | Hensgen |
| 2,942,983 | A | 6/1960 | Sadler |
| 3,192,626 | A | 7/1965 | Boeuf |
| 3,353,269 | A | 11/1967 | Lambert |
| 3,514,857 | A | 6/1970 | Rossen |
| 3,541,687 | A | 11/1970 | Peters |
| 3,615,587 | A | 10/1971 | Koopmans |
| 3,650,030 | A | 3/1972 | Delamere |
| 3,733,804 | A | 5/1973 | Diersbock |
| 3,748,072 | A | 7/1973 | Whelan |
| 3,783,166 | A | 1/1974 | Peters |
| 3,797,980 | A | 3/1974 | Budahn |
| 3,802,332 | A | 4/1974 | Fassbender et al. |
| 3,836,688 | A | 9/1974 | Fischer |
| 3,838,955 | A | 10/1974 | Dubbeld |
| 3,841,210 | A | 10/1974 | Brog |
| 3,973,042 | A | 8/1976 | Kosikowski et al. |
| 4,049,838 | A | 9/1977 | Krueger et al. |
| 4,068,014 | A | 1/1978 | Heimbruch |
| 4,268,528 | A | 5/1981 | Montigny |
| 4,318,684 | A | 3/1982 | Boucher |
| 4,418,616 | A | 12/1983 | Streeter et al. |
| 4,440,073 | A | 4/1984 | Quilliou |
| 4,472,339 | A | 9/1984 | van der Ploeg et al. |
| 4,509,413 | A | 4/1985 | Granberg et al. |
| 4,515,815 | A | 5/1985 | Kosikowski |
| 4,750,415 | A | 6/1988 | Ostemar |
| 4,817,515 | A | 4/1989 | Bjerre et al. |
| 5,052,290 | A | 10/1991 | Nielsen |
| 5,082,681 | A | 1/1992 | Barlow et al. |
| 5,206,496 | A | 4/1993 | Clement et al. |
| 5,794,779 | A | 8/1998 | Weinheimer et al. |
| 5,974,779 | A | 11/1999 | Orscheln et al. |
| 6,026,737 | A | 2/2000 | D'Alterio et al. |
| 6,465,033 | B2 | 10/2002 | Menninga et al. |
| 6,912,949 | B2 | 7/2005 | Brizio |
| 7,757,876 | B1 | 7/2010 | Ditter |
| 8,322,535 | B2 | 12/2012 | Shoham et al. |
| 8,512,792 | B2 | 8/2013 | Spijkerman |
| 8,916,221 | B2 * | 12/2014 | Waldburger ............ A01J 25/13 426/478 |
| 9,049,837 | B2 | 6/2015 | Waldburger |
| 9,713,314 | B2 | 7/2017 | Waldburger |
| 9,968,070 | B2 | 5/2018 | Waldburger |
| 2007/0196537 | A1* | 8/2007 | Winkler ................ A01J 25/123 426/36 |
| 2008/0036112 | A1 | 2/2008 | Gilg |
| 2010/0239730 | A1 | 9/2010 | Ditter |
| 2010/0263551 | A1 | 10/2010 | Pavero |
| 2014/0087014 | A1* | 3/2014 | Waldburger ............ A01J 25/13 425/84 |
| 2014/0087045 | A1* | 3/2014 | Waldburger ............ A01J 25/13 426/478 |
| 2015/0320007 | A1 | 11/2015 | Hamm et al. |
| 2017/0135309 | A1 | 5/2017 | Gruninger |
| 2017/0135310 | A1 | 5/2017 | Gruninger |
| 2017/0303498 | A1 | 10/2017 | Kong |
| 2019/0191659 | A1 | 6/2019 | Waldburger |

FOREIGN PATENT DOCUMENTS

| | | |
|---|---|---|
| CH | 563142 | 2/1972 |
| CH | 573142 B5 | 9/1972 |
| CH | 704208 A2 | 6/2012 |
| CH | 706999 | 3/2014 |
| CH | 706999 A1 | 3/2014 |
| CH | 707000 A1 | 3/2014 |
| DE | 821572 C | 7/1949 |
| DE | 878577 C | 6/1953 |
| DE | 922448 C | 1/1955 |
| DE | 1030612 B | 5/1958 |
| DE | 1582967 A1 | 7/1970 |
| DE | 2823182 A1 | 12/1978 |
| DE | 2950497 A1 | 6/1981 |
| DE | 3529895 A1 | 2/1987 |
| DE | 19613068 A1 | 10/1997 |
| DE | 29812845 U1 | 12/1998 |
| EP | 922448 C | 1/1955 |
| EP | 0126861 A1 | 3/1984 |
| EP | 0350777 A1 | 1/1990 |
| EP | 0406899 A1 | 1/1991 |
| EP | 0543185 A1 | 5/1993 |
| EP | 0543899 A1 | 6/1993 |
| EP | 0543185 61 | 9/1995 |
| EP | 0922448 A2 | 6/1999 |
| EP | 1269832 A1 | 1/2003 |
| EP | 1269832 61 | 10/2004 |
| EP | 1769676 A1 | 4/2007 |
| EP | 2710888 A1 | 3/2014 |
| EP | 2710889 A1 | 3/2014 |
| EP | 3167709 A1 | 5/2017 |
| EP | 3167709 B1 | 12/2018 |
| FR | 2146532 A5 | 3/1973 |
| FR | 2462253 A5 | 2/1981 |
| FR | 2473840 A1 | 7/1981 |
| FR | 2527421 A1 | 12/1983 |
| FR | 2919467 A1 | 2/2009 |
| FR | 2981827 A1 | 5/2013 |
| GB | 951746 A | 3/1964 |
| GB | 1054727 A2 | 1/1967 |
| GB | 2065487 A | 7/1981 |
| NL | 8402355 A | 2/1986 |
| WO | 1992/03297 A1 | 3/1992 |
| WO | 2004/087513 A1 | 10/2004 |
| WO | 2013/051950 A1 | 4/2013 |
| WO | WO 2013/051950 * | 4/2013 |

OTHER PUBLICATIONS

Derwent abstract for SU876084, published Oct. 1981, 2 pages.
European Search Report issued for Application No. 13183880.7, dated Feb. 4, 2014, 6 pages.
University of Montana, Agricultural Experiment Station Circular #1, 1910; dated Jul. 22, 1939.
European Search Report issued for Application No. 14181770, dated Feb. 9, 2015 (wth machine translation).
Google search results for "Considur fine hole trangular", retrieved Oct. 24, 20106 showing article entitled Belts With Interlaced Bards, Welded Wedge Wire Screens From Hein, www.hellotrade.com, 1 page, shown publication date Apr. 29, 2013.
Webpage from Hein Lehrmann website, Considur fine hole sheets, 1 page, retrieved Oct. 24, 2016, publication date prior to Jan. 1, 2013.
European Search Report issued for Application No. 15158045, dated Jul. 14, 2015, 3 pages.
European Search Report issued for Application No. 16194574, dated Feb. 14, 2017, 4 pages.
European Search Report issued for Application No. 16195210.6, dated Mar. 27, 2017, 3 pages.
European Search Report issued for Application No. 17165041, dated Sep. 7, 2017, 2 pages.
For U.S. Appl. No. 15/344,909: Office Actions dated Jan. 24, 2018; Jul. 24, 2018; Feb. 21, 2019; Sep. 25, 2019 Responses dated Mar. 26, 2018; Oct. 24, 2018; May 21, 2019.
For U.S. Appl. No. 15/486,464: Office Action dated Sep. 25, 2019.
For U.S. Appl. No. 15/344,770: Office Actions dated Jan. 24, 2018; Jul. 24, 2018; Feb. 21, 2019; Sep. 25, 2019 Responses dated Mar. 26, 2018; Oct. 24, 2018; May 21, 2019.
For U.S. Appl. No. 15/344,770: Response filed Dec. 25, 2019.

* cited by examiner

METHOD FOR HANDLING OF CHEESE BLOCKS

FIELD OF THE INVENTION

The invention relates to a method for purposes of handling cheese blocks, and a device for this purpose, which in particular can be assigned to a so-called cassette press with round or cornered cheese moulds.

BACKGROUND

A device for the industrial production of cheese blocks is of known art from e.g. EP-A-350777. This comprises a cheese press with a rectangular pan, open above, for the accommodation of moulds, a column frame for purposes of arranging a press head that can be raised and lowered, and a distribution head for purposes of supplying and metering the cheese curd into the moulds and a portal carriage that can traverse on the pan for purposes of guiding the distribution head and for purposes of manipulating a turning mechanism for the moulds. Here the distribution head and the turning mechanism must be manually prepared, that is to say, changed over. EP-A-406899 shows a further development of such a device in which the moulds are accommodated in cassettes, which in turn are arranged compactly in the form of rows in the pan. Above the moulds is provided a press head with compression rams aligned with the moulds for purposes of compressing the cheese curd. The cassettes have an edge design minimising clearance and a mechanised device is provided for purposes of moving the cassettes.

Moreover, a tray can be assigned to the pan for second moulds, into which the immature compressed cheese blocks are reloaded (EP-A-1769676). The moulds can be supplied by means of a roller conveyor of an appropriate handling device of the press to a further work section.

In accordance with EP-B-543185 a mould cover can be connected via a tilting device with the compression ram (in a self-centring manner) so that by virtue of possible tilting movements any suction of the mould cover onto the cheese mass is avoided. The mould itself is round or rectangular and can consist of an outer container and an inner perforated casing.

The compressed cheese blocks can, for example, be removed from the mould by means of a gripper, wherein air is blown into the press mould beforehand in order to release the cheese block from the mould wall (EP-B-1269832 or DE-B-922448).

Contact of the cheese block with the air or other gases that are blown in can present a hygiene problem. In order to avoid this attempts have also been made to remove the cheese block from the press mould by means of vacuum grippers. However, this leads to the formation of stubs, or in general to damage of the surface, or even to tearing of the cheese.

A further cassette press of this type is published in CH704208A2 and EP2710888A1. The cassette press in accordance with CH704208A2 has two handling devices, wherein the second handling device, which can travel along the longitudinal sides of the pan, interacts with a turning unit.

EP2710888A1 discloses a cassette press that is provided with a shaker, which is assigned to a horizontally arranged tray or conveyor for the compressed cheese block.

SUMMARY

Disclosed is a method for the automatic handling of cheese blocks, with which in particular a protective, rapid and precise removal of the cheese block from a primary mould and placement in a secondary mould can be achieved.

In accordance with at least some embodiments of the invention there takes place:

a) an operation of shaking or blowing onto a cheese curd compressed in a mould, wherein the mould, that is to say, a cassette with the moulds therein arranged, is rotated and lowered beforehand, and a pick-up plunger retracts into the mould as far as the cheese block, and after the shaking or blowing operation once again extends out of the mould, and the latter can then be rotated back into its initial position, b) a lifting gripper is lowered as far as the stop on a pick-up device (13), c) the cheese block in the mould is subjected to a shaking movement or a blowing operation, d) the mould, that is to say, the cassette, is then raised, rotated and guided back into its initial position in the cassette press, and the lifting gripper is raised, e) the cheese block is fixed in position on the lifting gripper by means of a clamping means, f) the lifting gripper is traversed, preferably downwards, towards a secondary mould for the cheese block, and g) the clamping means open, and the cheese block is positioned in the secondary mould.

The release of the cheese block, that is to say, the cheese curd, from the inner wall of the mould takes place by means of a shaking or a blowing operation on the compressed cheese block, immediately, that is to say, directly before removal from the mould. The shaking movement is introduced immediately after the operation of turning the mould, such that each cheese block can then lie on a pick-up plunger.

The shaking operation takes place only briefly and at least once.

The shaking movement can take place horizontally or vertically. The mould is thereby preferably lowered into a shaker.

Each cheese block can be pushed into the secondary mould with the pick-up plunger.

The cheese blocks are not only protectively but also hygienically removed from the mould and transported onwards.

Also disclosed is a device for the handling of cheese blocks, which enables a rapid reloading of cheese blocks.

Preferred forms of embodiment are disclosed as well.

The inventive device is of compact construction and enables automated handling and in particular gripping of the cheese block, and thus a rapid repopulation of the cassette press, since the cheese must only spend a short time in the moulds.

BRIEF DESCRIPTION OF THE DRAWINGS

In what follows an example of embodiment of the invention is described in more detail with the aid of figures. In the figures.

DETAILED DESCRIPTION

Figure 1:
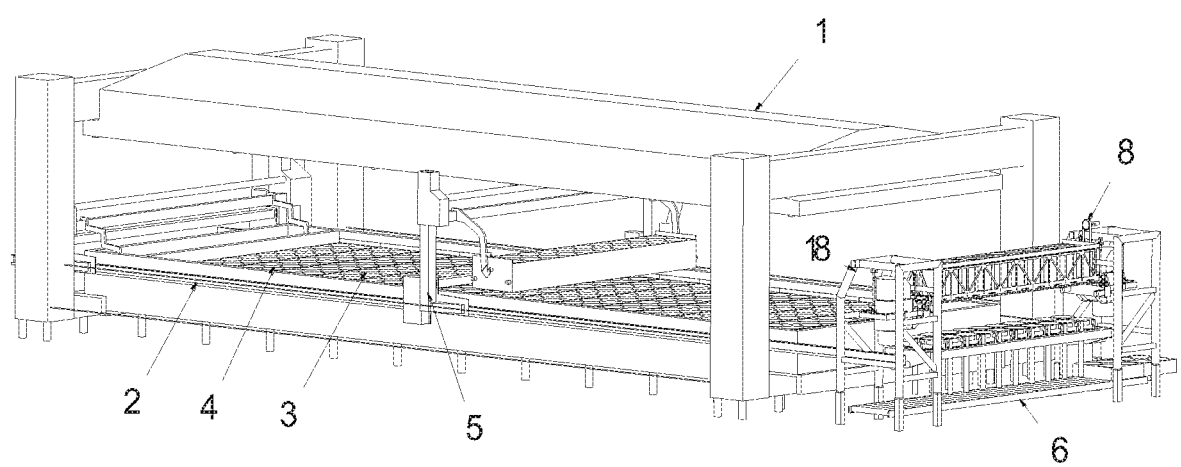
FIG. 1 shows a cassette press in a partial view.

A cassette press 1 for purposes of compressing a cheese curd so as to reduce the fluid content, taking into account the disclosures of CH-A-704208 A and/or CH 706999 A, comprises:
- a pan 2 that is rectangular in plan view and open upwards (FIG. 1), with cassettes 3 that are rectangular in plan view and open upwards; the latter are arranged side-by-side in rows transverse to the longitudinal direction of the pan 2,
- moulds 4 for purposes of accommodating the cheese curd to be compressed, which are arranged in the cassettes 3, wherein a mould 4 can be a part of the cassette 3 and has at least one floor and one casing, with at least one outlet for the fluid that is to be pressed out,
- on the upper edges, which form the outer sides of the cassette block in the pan 2 in the longitudinal and transverse directions, edge plates with a height of several centimetres can be arranged, to enable the cheese curd to be floated in (e.g. by means of a pipe distributor, or other means), up to above the upper edge of the cassette,
- a press head, mounted on end columns, with a multiplicity of compression rams, aligned with the moulds 4, and not explicitly represented, for purposes of compressing the cheese curd, designed e.g. in accordance with the disclosure of EP-B-543899, together with a hold-down device for purposes of releasing the press head from the cassettes 3,
- a pipe distribution system, that is to say, a filling apparatus, for purposes of floating in the cheese curd,
- at least one handling unit 5, which, driven by a motor, can travel along the longitudinal sides of the pan 2 for purposes of raising, traversing and handling a cassette 3 outside the pan 2 in particular also from and to a device 18 for purposes of removal from a mould, or placement in a mould, on the end face of the pan edge (FIG. 1).

A device 18 for purposes of handling the cheese block K is assigned to the cassette press 1; this has a device for purposes of rotating/turning the cassette 3 about its longitudinal axis (turning unit 8) and it is moreover provided with a shaker 7 arranged near to the turning unit 8. It also comprises a conveyor track 6 for secondary moulds 14.

The device 18 moreover comprises a lifting gripper 12 assigned to the conveyor track 6, mounted such that it can be traversed vertically, which is provided with at least one pick-up device 13 and devices for purposes of clamping the cheese blocks K.

Figure 2:
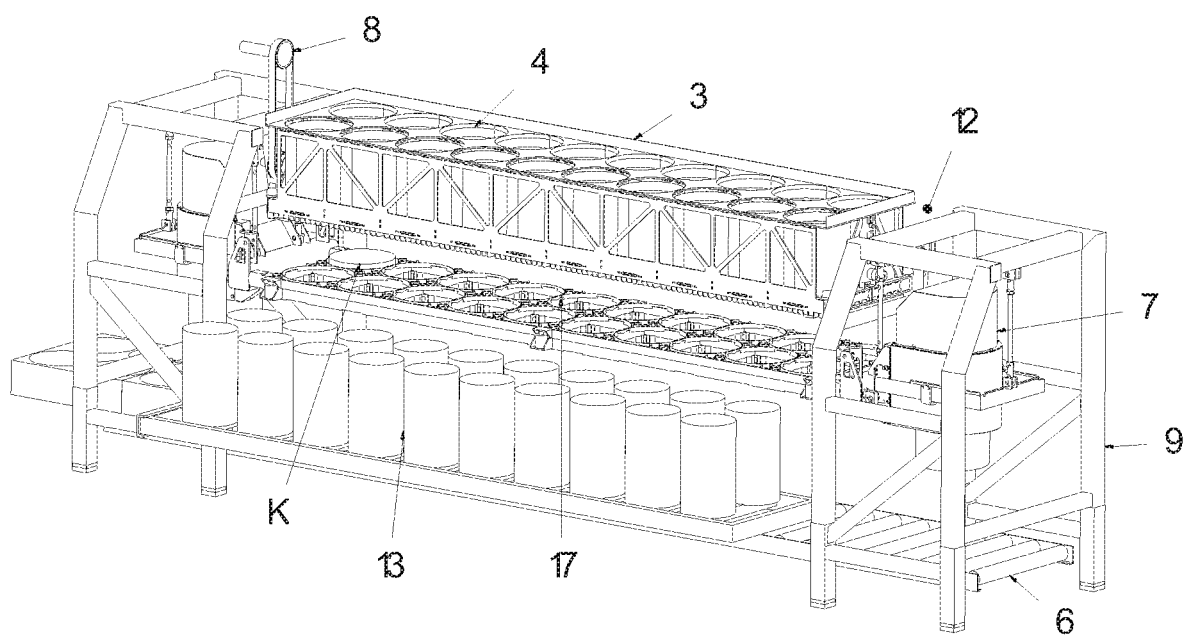
FIG. 2 shows an inventive lifting gripper with a pick-up device.

The device 18 for purposes of handling the cheese block K with a lifting gripper 12 in accordance with FIG. 2 comprises a frame 9 for purposes of accommodating the shaker 7 and the turning unit 8. The handling unit 5 of the cassette press enables the raising and lowering of the cassette 3. The lifting gripper 12 can be moved vertically between the cassette 3 and the conveyor track 6. The clamping devices of the lifting gripper 12 are clamping jaws.

The pick-up device 13 is located between the conveyor track 6 and the lifting gripper 12, and can be traversed horizontally.

The lifting gripper 12, the pick-up device 13, and the clamping jaws 11 can, for example, be actuated pneumatically or electrically.

For purposes of handling of cheese blocks K removed from the cassette press 1 the pick-up device 13 firstly retracts under the lifting gripper 12, which is raised beforehand, into the workspace 10 of the device 18, and the already supplied cassette 3 with the moulds 4 is turned through 180°, lowered into the shaker 7, and positioned over the pick-up device 13.

Synchronously with the lowering movement of the cassette 3, that is to say, of the moulds 4, the lifting gripper 12 is lowered until it comes into contact with the pick-up device 13, and the shaking or blowing operation is executed. The cheese blocks K are released from the mould wall and lie on the pick-up device 13.

Figure 5:
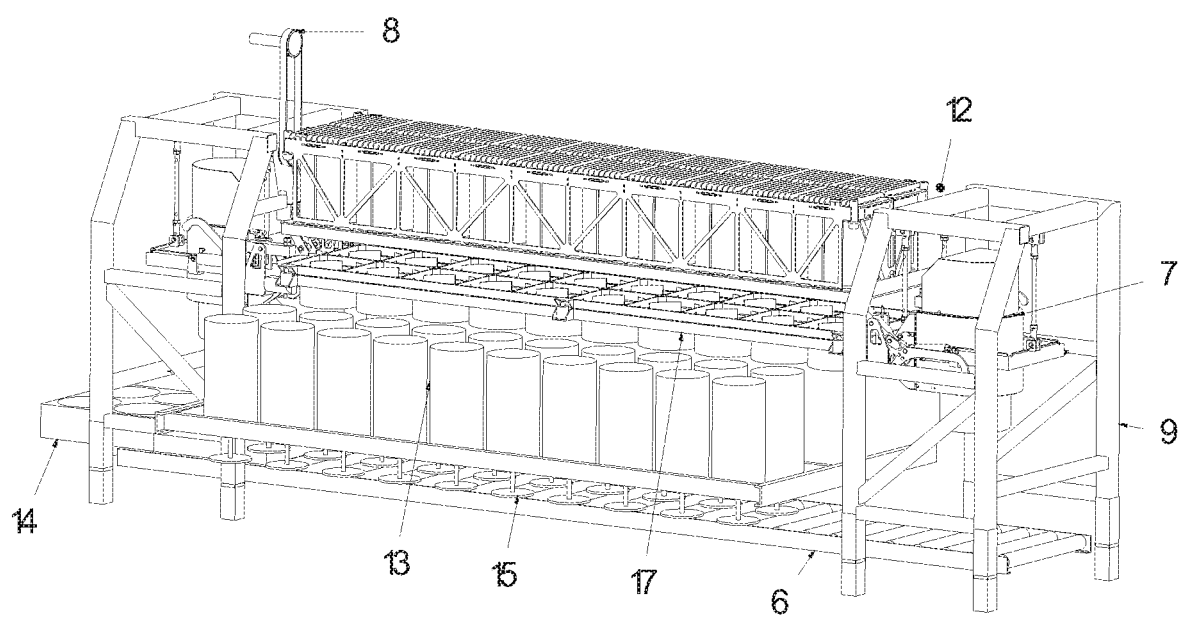
FIG. 5 shows an inventive lifting gripper with a pick-up device and an ejector.

In a form of embodiment in accordance with FIG. 5, the cassette 3 with the moulds 4, is then raised, again rotated through 180° into the initial position, and is traversed to the cassette press 1.

If, in a further possible configuration of the inventive device 18, push-in plungers are present, the lifting gripper 12 is raised up to a point at which the pick-up device 13 can extend under the latter, and the clamping jaws of the clamping frame 17 can clamp the cheese blocks K.

The lifting gripper 12 is then traversed towards the conveyor track 6 up to a point at which the pick-up device 13 can once again retract into the workspace 10, and the cheese blocks K can be pushed with the push-in plungers into the secondary moulds 14, for which purpose the clamping jaws 11 are also opened once again beforehand. The lifting gripper 12 is then raised up to its initial position and the pick-up device 13 can extend out of the workspace 10.

The secondary moulds 14 are traversed on the conveyor track 6 to another workstation and empty secondary moulds 14 are supplied.

Figure 3:
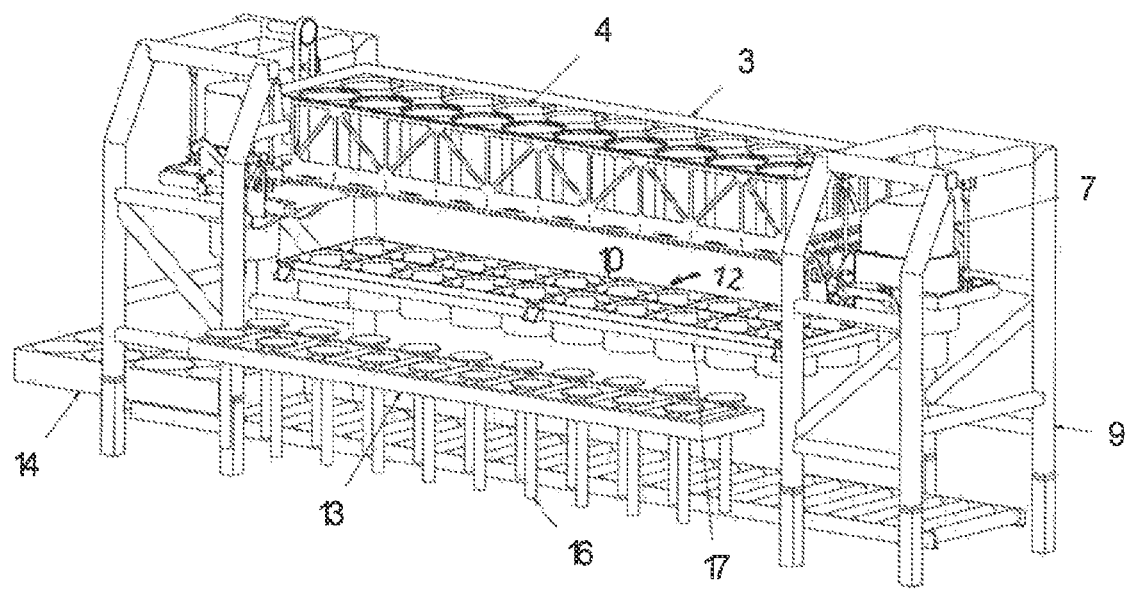
FIG. 3 shows an inventive lifting gripper with a pick-up device and a pick-up plunger.

The device 18 for purposes of handling the cheese block K with a lifting gripper 12 in a form of embodiment in accordance with FIG. 3 comprises a frame 9 for purposes of accommodating the shaker 7 and the turning unit 8. The handling unit 5 enables a raising and lowering of the cassette 3. The lifting gripper 12 can be moved vertically between the cassette 3 and the conveyor track 6. The clamping devices of the lifting gripper 12 are clamping jaws.

The pick-up device 13 is fitted with pick-up plungers 16, and is located between the conveyor track 6 and the lifting gripper 12, and can be traversed horizontally.

The lifting gripper 12, the pick-up device 13, the pick-up plungers 16, and the clamping jaws 11 can, for example, be actuated pneumatically or electrically.

For purposes of handling cheese blocks K removed from the cassette press 1, the already supplied cassette 3 with the moulds 4 is turned through 180° and lowered into the shaker 7.

The pick-up device 13 then retracts into the workspace 10 of the device 18, the pick-up plungers 16 are extended into the moulds 4 of the cassette 3, and the shaking or blowing operation is executed. The cheese blocks K are released from the mould wall and lie on the pick-up plungers 16.

The cassette 3 is then raised, again rotated through 180° into the initial position, and is traversed to the cassette press 1.

The pick-up plungers 16 are traversed vertically (lowered) with the cheese blocks K lying on them, in the direction of the secondary moulds 14, and the clamping jaws 11 can now clamp the cheese blocks K.

The pick-up device 13 is then extended out of the workspace 10, and the lifting gripper 12 is traversed downwards towards the conveyor track 6 to a point at which the cheese blocks K can slide into the secondary moulds 14, for which purpose the clamping jaws 11 are also opened once again beforehand.

The lifting gripper 12 is then raised up to its initial position.

The secondary moulds 14 are traversed on the conveyor track 6 to another workstation and empty secondary moulds 14 are then supplied.

The device 18 for purposes of handling the cheese block K with a lifting gripper 12 in accordance with FIG. 5 comprises a frame 9 for purposes of accommodating the shaker 7 and the turning unit 8. The handling unit 5 enables a raising and lowering of the cassette 3.

The device 18 also has an ejector 15 for each mould 4.

The lifting gripper 12 can be moved vertically between the cassette 3 and the conveyor track 6. The clamping devices of the lifting gripper 12 are clamping jaws 11.

The pick-up device 13 is located between the conveyor track 6 and the lifting gripper 12, and can be traversed horizontally.

The pick-up device 13 is fitted with the ejectors 15, one for each of the moulds 4, that is to say, each of the cheese blocks K.

The lifting gripper 12 is driven by an electric motor, while the pick-up device 13, the ejectors 15, and the clamping jaws 11 can, for example, be actuated pneumatically or electrically.

For purposes of handling cheese blocks K removed from the cassette press 1 the pick-up device 13 firstly retracts under the lifting gripper 12 into the workspace 10 of the device 18, and the lifting gripper 12 is then lowered until it comes into contact with the pick-up device 13.

The already supplied cassette 3 with the moulds 4 is turned through 180°, lowered into the shaker 7, and positioned above the pick-up device 13, and the shaking or blowing operation is executed.

The cheese blocks K are released from the mould wall and lie on the pick-up device 13.

The cassette 3 is then raised, again rotated through 180° into the initial position, and is traversed to the cassette press 1.

The lifting gripper 12 is raised up to a point at which the pick-up device 13 can extend under it. The clamping jaws 11 can now clamp the cheese blocks (K).

The lifting gripper 12 is then traversed downwards towards the conveyor track 6 up to a point at which the pick-up device 13 can once again retract into the workspace 10, and the cheese blocks K can be pushed with their ejectors 15 into the secondary moulds 14, for which purpose the clamping jaws 11 can also (optionally) be opened once again beforehand.

The ejectors 15 then retract once again into the pick-up device 13, and the pick-up device 13 extends out of the workspace 10, and the lifting gripper 12 is raised up to its initial position.

The secondary moulds 14 are traversed on the conveyor track 6 to another workstation, and empty secondary moulds 14 are supplied.

Figure 4:
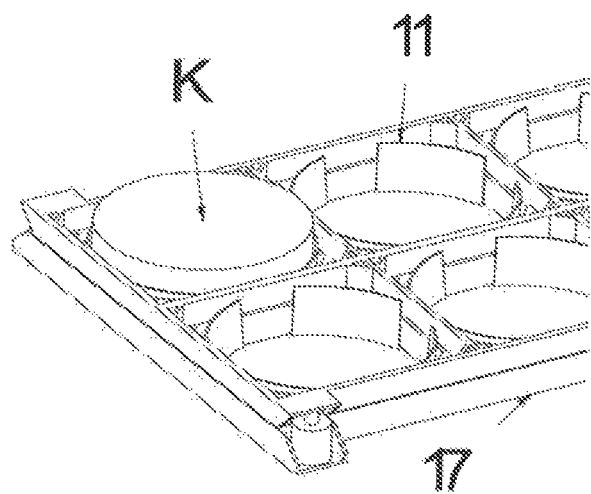
FIG. 4 shows a clamping bar of the inventive device with clamping jaws.

The clamping jaws 11 can be arranged in a clamping beam 10 and are actuated collectively via the clamping beam 10 (FIG. 4).

The shaking movement is preferably executed horizontally, and takes place at least once.

Both on the pick-up device 13 and also in the secondary moulds 14, the cheese blocks K are located in a defined manner, and no manual access is necessary.

The lifting grippers 12 can in principle be employed for all cheese shapes.

REFERENCE LIST

1 Cassette press
2 Pan
3 Cassette
4 Mould
5 Handling equipment
6 Conveyor track
7 Shaker
8 Turning unit
9 Frame
10 Workspace
11 Clamping jaw
12 Lifting gripper
13 Pick-up device
14 Secondary mould
15 Ejector
16 Pick-up plunger
17 Clamping frame
18 Device
K Cheese block

What is claimed is:

1. A method for handling a plurality of cheese blocks that have beforehand been pressed out of a cheese curd into a corresponding plurality of moulds of a cassette press, the moulds being arranged in a cassette, the method comprising:
    performing an operation of shaking or blowing the cheese curd compressed in the moulds so that the compressed cheese curd is released from an inner wall of the moulds,
    wherein before the shaking or blowing operation:
        a) the cassette containing the moulds is rotated and lowered,
        b) for each of the moulds in the cassette, a pick-up plunger retracts into the mould up to the cheese block, and
        c) a lifting gripper is lowered as far as a stop on a pick-up device, and
    after the shaking or blowing operation:
        d) the cassette containing the moulds is raised, rotated, and guided back into its initial position in the cassette press, and the lifting gripper is raised,
        e) each of the cheese blocks is fixed in position on the lifting gripper by a clamping device,
        f) the lifting gripper is traversed towards secondary moulds for the cheese blocks, and
        g) the clamping devices open and each of the cheese blocks is positioned in one of the secondary moulds.

2. The method in accordance with claim 1, wherein each of the cheese blocks is pushed into one of the secondary moulds.

3. The method in accordance with claim 1, wherein for each of the cheese blocks, an ejector pushes the cheese block into one of the secondary moulds and then the ejector is retracted into its initial position.

4. The method in accordance with claim 1, wherein in step b), the pick-up plunger retracts into the mould so as to be located a small distance from the cheese block.

5. The method in accordance with claim 1, wherein in step b), the pick-up plunger retracts into the mould so as to be located on the cheese block.

6. The method in accordance with claim 1, wherein the shaking or blowing operation includes shaking and blowing.

7. The method in accordance with claim 1, wherein before the shaking or blowing operation, the pick-up device is retracted under the lifting gripper into a workspace.

8. The method in accordance with claim 1, wherein after the shaking or blowing operation, for each of the moulds in the cassette, the pick-up plunger extends out of the mould with the cheese block lying on the pick-up plunger.

9. The method in accordance with claim 1, wherein the cassette is positioned above the pick-up device.

10. The method in accordance with claim 1, wherein the shaking or blowing operation includes shaking, the shaking movement is executed horizontally or vertically, and takes place at least once.

11. The method in accordance with claim 1, wherein each of the cheese blocks is slid into one of the secondary moulds.

12. The method in accordance with claim 1, wherein before the shaking or blowing operation, for each of the moulds in the cassette, the pick-up plunger is guided into the mould.

13. The method in accordance with claim 1, wherein after step g), the lifting gripper is guided back into its initial position.

14. The method in accordance with claim 1, wherein after the lifting gripper has traversed towards the secondary moulds, the pick-up device retracts.

15. The method in accordance with claim 14, wherein for each of the cheese blocks, an ejector pushes the cheese block into one of the secondary moulds and then the ejector is retracted into its initial position.

16. A method for handling a plurality of cheese blocks that have been pressed out of a cheese curd into a corresponding plurality of moulds of a cassette press, the moulds being arranged in a cassette, the method comprising:
    rotating and lowering the cassette containing the moulds, and lowering a lifting gripper as far as a stop on a pick-up device;
    after the rotating and lowering of the cassette, performing an operation of shaking or blowing the cheese curd compressed in the moulds to release the compressed cheese from the moulds;
    after the performing of the shaking or blowing operation, raising the cassette containing the moulds, rotating it, and guiding it back into the cassette press, and raising the lifting gripper;
    after raising the cassette, using a clamping device to fix each of the cheese blocks in position on the lifting gripper;
    after using the clamping device to fix each of the cheese blocks, lowering the lifting gripper towards secondary moulds for the cheese blocks; and
    after lowering the lifting gripper towards the secondary moulds, opening the clamping devices and sliding or pushing the cheese blocks into the secondary moulds.

17. The method in accordance with claim 16, further comprising:
    after the rotating and lowering of the cassette and before the performing of the shaking or blowing operation, retracting a pick-up plunger into each of the moulds in the cassette up to the cheese block; and
    after the performing of the shaking or blowing operation, for each of the moulds in the cassette, extending the pick-up plunger, with the cheese block lying thereon, out of the mould.

18. The method in accordance with claim 16, wherein after the shaking or blowing operation, each of the cheese blocks lies on a pick-up plunger.

19. The method in accordance with claim 16, further comprising:
    after lowering the lifting gripper towards the secondary moulds, retracting the pick-up device,
    wherein sliding or pushing the cheese blocks into the secondary moulds comprises using an ejector to push each of the cheese blocks into one of the secondary moulds and then retracting the ejector.

* * * * *